United States Patent [19]

McEwan

[11] Patent Number: 5,576,627
[45] Date of Patent: Nov. 19, 1996

[54] NARROW FIELD ELECTROMAGNETIC SENSOR SYSTEM AND METHOD

[75] Inventor: Thomas E. McEwan, Livermore, Calif.

[73] Assignee: The Regents of the University of California, Oakland, Calif.

[21] Appl. No.: 405,644

[22] Filed: Mar. 17, 1995

Related U.S. Application Data

[63] Continuation-in-part of Ser. No. 300,909, Sep. 6, 1994, Pat. No. 5,510,800.

[51] Int. Cl.$^6$ .................................................. G01S 13/00
[52] U.S. Cl. ............................ 324/639; 342/27; 340/552
[58] Field of Search ........................ 342/27, 28; 340/552; 324/639, 640, 641

[56] References Cited

U.S. PATENT DOCUMENTS

| | | | |
|---|---|---|---|
| 3,471,845 | 10/1969 | Sokoloff | 342/27 |
| 3,810,172 | 5/1974 | Burpee | 342/27 |
| 4,191,953 | 3/1980 | Woode | 342/27 |
| 4,274,226 | 6/1981 | Evans | 340/552 |
| 4,322,722 | 3/1982 | Kozdon | 342/28 |
| 4,415,885 | 11/1983 | Mongeon | 340/552 |
| 4,419,659 | 12/1983 | Harman | 340/552 |
| 4,531,117 | 7/1985 | Nourse | 342/27 |
| 4,598,293 | 7/1986 | Wong | 342/27 |
| 4,639,902 | 1/1987 | Leverance | 342/27 |

Primary Examiner—Kenneth A. Wieder
Assistant Examiner—Jose M. Solis
Attorney, Agent, or Firm—Henry P. Sartorio

[57] ABSTRACT

A narrow field electromagnetic sensor system and method of sensing a characteristic of an object provide the capability to realize a characteristic of an object such as density, thickness, or presence, for any desired coordinate position on the object. One application is imaging. The sensor can also be used as an obstruction detector or an electronic trip wire with a narrow field without the disadvantages of impaired performance when exposed to dirt, snow, rain, or sunlight. The sensor employs a transmitter for transmitting a sequence of electromagnetic signals in response to a transmit timing signal, a receiver for sampling only the initial direct RF path of the electromagnetic signal while excluding all other electromagnetic signals in response to a receive timing signal, and a signal processor for processing the sampled direct RF path electromagnetic signal and providing an indication of the characteristic of an object. Usually, the electromagnetic signal is a short RF burst and the obstruction must provide a substantially complete eclipse of the direct RF path. By employing time-of-flight techniques, a timing circuit controls the receiver to sample only the initial direct RF path of the electromagnetic signal while not sampling indirect path electromagnetic signals. The sensor system also incorporates circuitry for ultra-wideband spread spectrum operation that reduces interference to and from other RF services while allowing co-location of multiple electronic sensors without the need for frequency assignments.

26 Claims, 6 Drawing Sheets

NARROW FIELD ELECTROMAGNETIC SENSOR SYSTEM AND METHOD

The United States Government has rights in this invention pursuant to Contract Number W-7405-ENG-48 between the United States Department of Energy and the University of California for the operation of Lawrence Livermore National Laboratory.

CONTINUING APPLICATION DATA

This application is a continuation-in-part of U.S. application Ser. No. 08/300,909 titled "Time-of-Flight Radio Location System," Attorney Docket No. IL-9516, filed Sep. 6, 1994, now U.S. Pat. No. 5,510,800, issued Apr. 23, 1996.

BACKGROUND OF THE INVENTION

1. Field of the Invention

The present invention relates to electronic sensors, and more particularly to sensors utilizing ultra-wideband transmitters and receivers in narrow field applications.

2. Description of Related Art

One type of narrow field sensor can be referred to as a "trip wire." A mechanical "trip wire" detects motion in or through a narrow field when pressure is applied to a trip wire placed across a path in the narrow field. Non-mechanical "trip wires," such as those formed with electromagnetic radiation or ultrasound, also exist. Laser, infrared, and ultrasound "trip wires" detect motion in or through a narrow field by sensing a disruption in the narrow field across a path. Some examples of "trip wire" applications include using it for game trapping, conveyor belt counting, people counting, and safety sensing for automatic doors. Thus, a "trip wire" sensor can be used to activate a net for trapping game, to count objects on a conveyor belt, count people at a doorway entrance, or to prevent an open automatic door from closing when people are in the vicinity of the doorway.

Common electronic narrow field sensors are based on laser, ultrasound, or infrared techniques. Laser or infrared beam-interruption sensors can be focused in a narrow field. However, visibility between the two ends of the field is required and anything that affects this visibility may impair the sensor. Thus, interference from sunlight, dirt, or snow prevents the proper operation of this sensor. Infrared sensors also have no range adjustments. Similarly, optical and ultrasound sensors suffer from blockage by dirt, rain, snow, or any other material. Sunlight will also provide harmful interference for optical sensors.

The transducers in optical, ultrasound, and magnetic sensors are also expensive to manufacture and thus, make them less attractive for commercial purposes. Other sensors are also not commercially feasible because they drain too much power.

FM-CW and Doppler radar sensors, which might be applied as trip wires, also suffer limitations: low material penetration due to the higher frequencies employed, microphonics caused by the use of short radar wavelengths combined with audio frequency processing, frequency crowding, and poor short-range operation.

Although directional antennas with narrow beamwidths may provide an adequately narrow field or trip wire, they are too expensive in a compact package. Furthermore, at some frequencies, narrow beamwidths are almost impossible to produce in a compact antenna without increasing its complexity. The low frequency microwave band is one example. Thus, at this band, material penetration is available but a compact and practically available narrow beamwidth antenna is not.

Another limitation of these sensors is that, for image processing applications, certain characteristics of the object cannot be obtained. For example, the thickness or density of an object at any desired region of the object cannot be determined.

An effective and commercially practical sensor should be inexpensive to manufacture, drain as little power as possible, last a long time, and be durable and impervious to harsh environmental conditions such as dirt, rain, snow, and sunlight. Furthermore, sensors should be able to use signals that can penetrate certain material without damaging the material. Such material penetration allows users to install these sensors behind wood, concrete, or other objects for security purposes and still permit the sensor to function. The compact size of sensors is also desirable to reduce cost, reduce complexity, and provide ease of installation. In other applications, motion sensors that are insensitive to movement of the sensors themselves are particularly valuable when these sensors are placed on moving objects.

SUMMARY OF THE INVENTION

The present invention is a cost-effective, low power, and long-lasting electronic sensor that is impervious to harsh environmental conditions such as dirt, rain, snow, and sunlight. Furthermore, the sensor of the present invention uses signals that can penetrate certain materials (without damaging the material) to allow users to install them behind wood, concrete, or other objects for security purposes. The sensor can also be placed on a moving object without impairing its performance. The sensor can be used for electronic trip wire and image processing applications.

The present invention can be characterized as a narrow field electromagnetic sensor, comprising a transmitter, a receiver, a timing circuit, and a signal processor. The transmitter transmits a sequence of electromagnetic signals in response to a transmit timing signal. The receiver samples the sequence of electromagnetic signals in response to a receive timing signal and generates a sampled signal. The timing circuit supplies the transmit timing signal to the transmitter and the receive timing signal to the receiver, where the receive timing signal causes the receiver to sample a portion of each electromagnetic signal that travels along a direct RF path between the transmitter and the receiver. The signal processor coupled to the output of the receiver and responsive to the sampled signal provides an indication of a characteristic, such as presence in the narrow field or density, of the object.

The sensor can also include a phase modulator for modulating the receive timing signal into a plurality of phase states for sampling the sequence of electromagnetic signals. The phase modulator includes a quadrature-phase modulator providing four phase states of about 0 degrees, about 90 degrees, about 180 degrees, and about 270 degrees. Based on the phase modulator, the receiver changes phase states sequentially at a frequency of about 500 Hz. In other embodiments, the phase states change at a frequency between 10 Hz and 100 KHz.

In some embodiments, the electromagnetic signal is an RF pulse providing a wide band signal or a short burst of several cycles to provide a narrower band signal. The transmitter of the present invention which generates the electromagnetic signal further comprises a line receiver, a transmitter pulse forming network, and a pulsed transmitter RF switch or oscillator. The line receiver shapes the transmit timing signal. The transmitter pulse forming network coupled to the output of the line receiver and responsive to the amplified transmit timing signal generates a transmitter pulse. The pulsed transmitter RF switch or oscillator coupled to the output of the transmitter pulse forming network and responsive to the transmitter pulse forms the electromagnetic signal.

The receiver of the present invention further comprises a receiver pulse forming network, a pulsed receiver switch or RF oscillator, and a sampling circuit. The receiver pulse forming network coupled to the output of the timing circuit and responsive to the receive timing signal forms a receiver pulse. The pulsed receiver switch or RF oscillator coupled to the output of the pulse forming network and responsive to the receiver pulse forms a receiver gating signal. The sampling circuit coupled to the output of the pulsed receiver RF oscillator and responsive to the receive gating signal and the electromagnetic signal forms a sampled signal.

The signal processor of the present invention comprises a band limited amplifier, a peak detector, and a comparator. The amplifier is bandlimited to provide coherent integration of a large number (e.g., 10–10,000) of received and sampled RF pulses. The amplifier coupled to the output of the sampling circuit and responsive to the sampled signal generates an amplified sampled signal. The peak detector coupled to the output of the amplifier and responsive to the amplified sampled signal generates a peak detected signal which is an indication of a characteristic of the object. The comparator is coupled to the output of the peak detector and responsive to the peak detected signal and a predetermined reference signal. The comparator generates an eclipse indication when the peak detected signal is less than the reference signal.

In other embodiments, a noise generator can be coupled to the input of the timing circuit for providing random variations to the timing circuit. This reduces interference among co-located sensors because it is unlikely that two sensors will simultaneously transmit and sample the pulses.

In another embodiment of the present invention, the sensor can be mounted with a scanner to obtain a multidimensional characteristic of the object. The scanner comprises a translation stage and a processor and storage unit. The translation stage mounts the transmitter and the receiver and moves the transmitter and the receiver with respect to the object. The processor and storage unit coupled to the signal processor and responsive to the sampled signal stores a coordinate position on the object and the magnitude of the sampled signal at each coordinate position.

The present invention can also be characterized as an electronic trip wire. The electronic trip wire comprises a transmitter, a receiver, a timing circuit, and an eclipse indicating circuit. The transmitter, responsive to a transmit timing signal, generates a sequence of RF pulses or bursts. The receiver responsive to a receive timing signal samples a portion of each RF burst and generates a sampled receive signal. The timing circuit provides the transmit timing signal to the transmitter and the receive timing signal to the receiver so that the receiver samples only a portion of each RF burst that corresponds to a direct RF path of the RF pulse or burst between the transmitter and the receiver. The eclipse indicating circuit coupled to the output of the receiver and responsive to the sampled receive signal provides an eclipse indication when an object obstructs the path of the RF pulse or burst along the direct RF path. Furthermore, the electronic trip wire includes a pulse repetition frequency generator coupled to the input of the timing circuit for providing a clock signal. In one example, the frequency of the clock signal is about 2 MHz.

The timing circuit of the present invention comprises a phase modulator coupled to the output of the pulse repetition frequency generator and responsive to the clock signal for generating a receive timing signal that sequentially moves among a plurality of phase states to sample the RF pulse or burst traveling along the direct RF path. The timing circuit includes a delay circuit which compensates for the direct RF path time-of-flight distance between the transmitter and the receiver so that the receiver samples a portion of the RF burst travelling along the direct RF path. The transmitter and receiver of the present invention are analogous to those of the sensor as described above.

The eclipse indicating circuit of the present invention comprises a peak detector and a comparator. The peak detector responsive to the sampled receive signal provides a peak detected signal. The comparator coupled to the output of the peak detector and responsive to the peak detected signal and an adjustable reference signal provides an eclipse indication when the peak detected signal is less than the reference signal.

The present invention can be characterized as a method of sensing a characteristic of an object, comprising the steps: providing a common clock signal; deriving a transmit timing signal and a receive timing signal from the common clock signal, the receive timing signal adjusted so that sampling of the electromagnetic signal coincides with the arrival of the electromagnetic signal corresponding to the direct RF path; transmitting a sequence of electromagnetic signals in response to the transmit timing signal; receiving each electromagnetic signal in response to the receive timing signal to provide a sampled signal; and providing an indication of a characteristic of the object from the magnitude of the sampled signal.

The step of transmitting a sequence of electromagnetic signals further comprises forming a transmit pulse in response to the transmit timing signal, and forming an electromagnetic signal in response to the transmit pulse. The step of receiving the electromagnetic signal further comprises forming a receiver pulse in response to the receive timing signal, forming a receive gating signal in response to the receiver pulse that samples only the direct RF path portion of the electromagnetic signal, and forming a sampled signal in response to the receive gating signal and the electromagnetic signal.

Additional steps in other embodiments include comparing the magnitude of the sampled signal with the magnitude of an adjustable reference signal; and providing a trip indication when the magnitude of the sampled signal is less than the magnitude of the adjustable reference signal. Other embodiments include noise dithering the common clock signal to reduce interference among co-located sensors.

Another embodiment includes the step of phase modulating the clock signal to provide a receive timing signal so that sampling the electromagnetic signal occurs at one of a plurality of phase states, each phase state measured from the leading edge of the direct RF path electromagnetic signal.

Other aspects and advantages of the present invention can be ascertained upon review of the figures, the detailed description, and the claims which follow.

DETAILED DESCRIPTION OF PREFERRED EMBODIMENTS

The embodiments of the present invention have a wide variety of applications ranging from image processing to electronic trip wires. The sensor of the present invention uses time-of-flight techniques to precisely determine the range between the transmitter and the receiver. With the set range, the sensor can exclude all but the direct path propagation wave of the transmitted electromagnetic signal. With the signal processing circuitry employed in the sensor, narrow sensor regions can be effectively generated even with omni-directional antennas. The sensor is concealable; as a security device, the sensor can be installed on either side of a doorway or hallway and detect passersby from behind the wood door frame or concrete walls. The sensor is stealthy; its RF emissions are nearly undetectable. The sensor is inexpensive to manufacture; its components are inexpensive and its transducer is a short piece of wire serving as the antenna.

As a safety or industrial sensor, the embodiments of the present invention can detect the presence of a person or a car in an automatic doorway, or detect objects on a conveyor belt. The sensor can also be hermetically sealed against harsh environments; it is impervious to blockage by dirt, snow, wood, concrete, and rain. The sensor system also incorporates circuitry for an ultra-wideband spread spectrum system that reduces interference to and from other RF services while allowing co-location of multiple electronic sensors without the need for frequency assignments.

For image processing, the embodiments of the present invention can be adapted for use with ballistic photon techniques for imaging characteristics of an object in a medium. When the medium is air, electromagnetic radiation travels at the speed of light and the resolution for imaging the object is low. When the medium has a higher index of refraction, such as water, electromagnetic radiation travels at a slower speed and a higher imaging resolution is possible. The sensor provides an indication of a characteristic of the object to an imaging processor for storage and further processing. A complete scan of the object by the sensor of the present invention provides the imaging processor with an equivalent image and other characteristics of the object. The frequency band used in the sensor of the present invention is harmless to all tissue, particularly mammalian tissue including human tissue.

Figure 2:
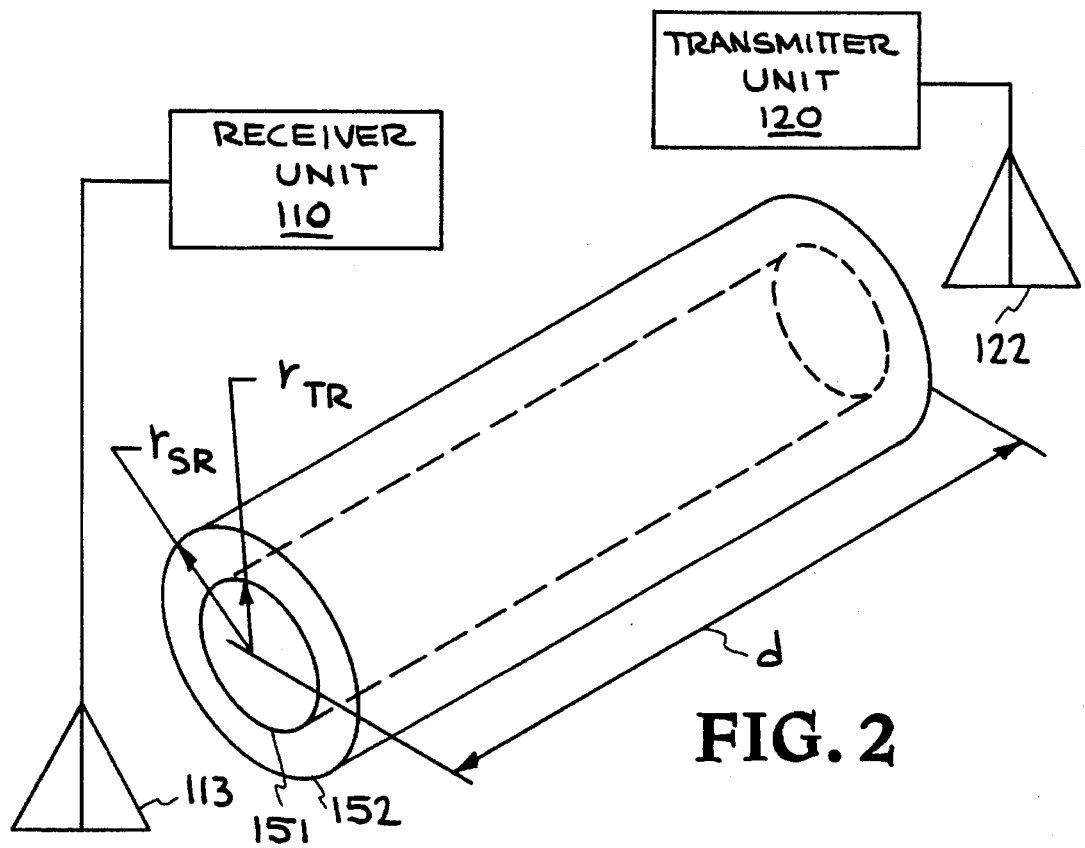
FIG. 2 is a simplified model of the sensor region and the trip region in accordance with the present invention.
Figure 3:
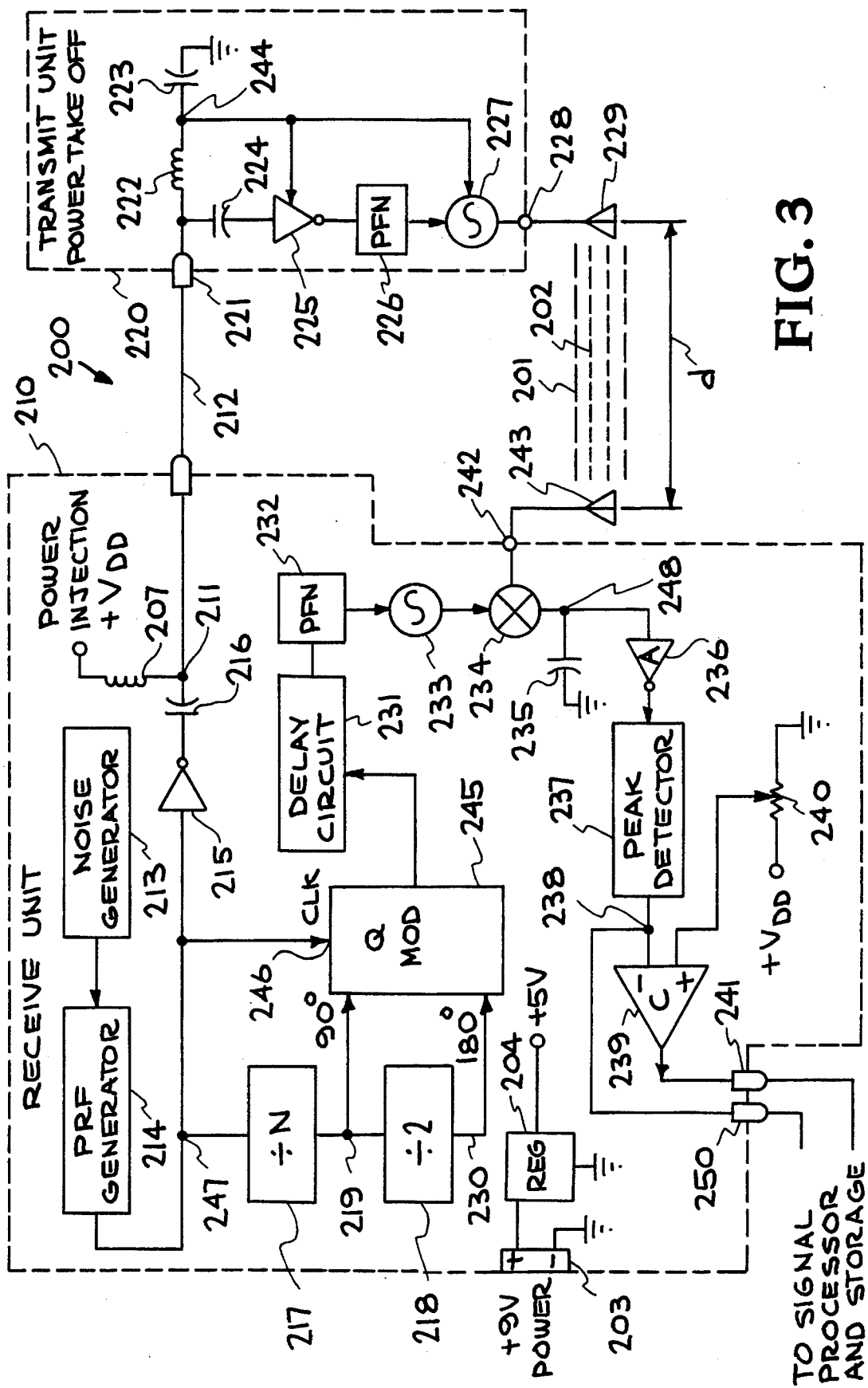
FIG. 3 is a simplified block diagram showing more details of the receiver and the transmitter according to the present invention.

The embodiments of the present invention utilize time-of-flight techniques as described in co-pending U.S. application Ser. No. 08/300,909 titled "Time-of-Flight Radio Location System," Attorney Docket No. IL-9516, filed Sep. 6, 1994, now U.S. Pat. No. 5,510,800, issued Apr. 23, 1996, which is incorporated herein by reference. A detailed description of the preferred embodiments of the present invention is provided with reference to the figures, in which FIGS. 1, 2, and 3 provide illustrations of the basic concept.

Figure 1:
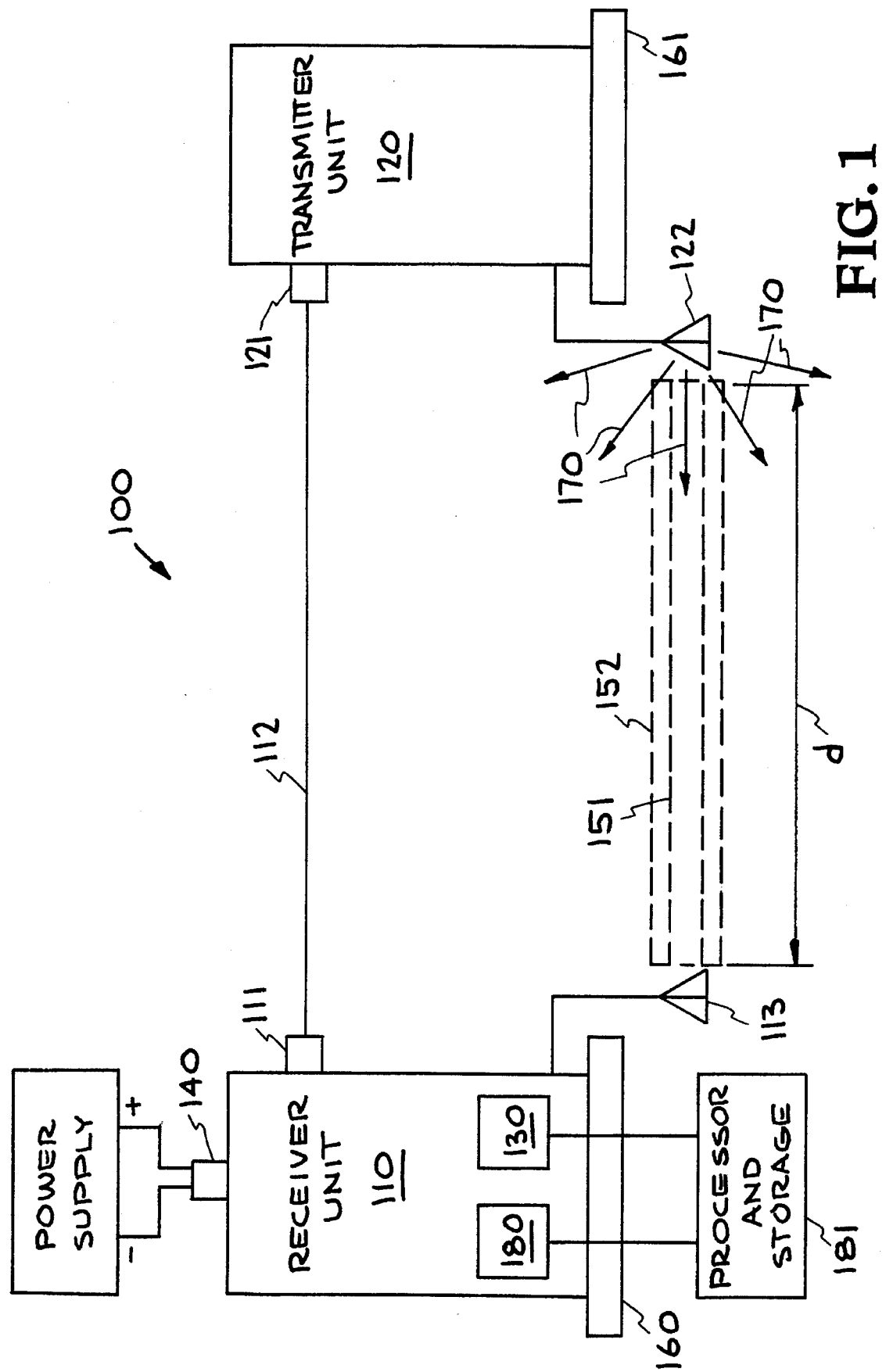
FIG. 1 is a simplified block diagram showing an embodiment of the present invention.

In FIG. 1, sensor 100 includes a receiver 110, a transmitter 120, a cable 112 connecting the receiver 110 and the transmitter 120 to each other, a transmitter antenna 122, and a receiver antenna 113. The transmitter 120 and receiver 110 use radio frequency (RF) signals to generate a sensor region 151. The transmitter antenna 122 and the receiver antenna 113 are each a short piece of wire that radiates signals omnidirectionally. The distance, d, between the transmitter antenna 122 and the receiver antenna 113 is user-defined and fixed for any given installation; however, the maximum distance d is limited only by path losses and other factors that contribute to RF signal degradation.

To couple the transmitter 120 to the receiver 110, one end of the cable 112 is connected to pod 111 of the receiver 110 and the other end is connected to port 121 of the transmitter 120. The sensor 100 receives power at pod 140 of the receiver 110. The receiver 110 and transmitter 120 are placed on or mounted in objects 160 and 161, respectively. These objects can be the floor or any support frame in a wall.

In response to a transmit timing signal, the transmitter 120 transmits an electromagnetic signal 170 via transmitter antenna 122. In accordance with one embodiment of the present invention, the electromagnetic signal 170 is a short RF pulse or burst. The receiver 110 receives the electromagnetic signal 170 at receiver antenna 113. Because of scattering and interference from nearby objects, the receiver 110 receives the electromagnetic signal 170 at receiver antenna 113 from multiple paths (direct paths and indirect paths).

FIG. 1 shows a sensor region 152. FIG. 2 shows a more detailed representation of the sensor region 152. With reference to FIGS. 1 and 2, the sensor region 152 includes a trip region 151. Both regions are conceptually cylindrical in shape and lie between the transmitter antenna 122 and the receiver antenna 113. The sensor region 152 has a radius of $r_{SR}$ and occupies a volume of $\pi r_{SR}^2 d$. The trip region 151 has a radius of $r_{TR}$ and occupies a narrower volume of $\pi r_{TR}^2 d$. Trip region 151 also represents the direct RF path of the electromagnetic signal 170 from the transmitter 120 to the receiver 110.

The cylindrical representation of the sensor region 152 in FIG. 2 is a model. No physical cylinder actually exists. In fact, depending on the application and installation, the region between the transmitter antenna 122 and the receiver antenna 113 may be partially obstructed by wood, concrete, dirt, or other material. The model merely conveys the concept that activation of the sensor is possible in a narrow cylindrical region called the trip region which is also the transmitter-to-receiver direct RF path of the electromagnetic signal.

When an object moves across the sensor region 152 in a direction transverse to its length, or distance d, so that the object impinges the sensor region 152 first and then the trip region 151, the magnitude of the electromagnetic signal received by the receiver 110 decreases. When the object obstructs, or eclipses, the trip region 151 substantially in its entirety, the eclipse indicator 130 (in FIG. 1) of the receiver 110 provides an output indicating that the sensor has been activated. The eclipse indicator 130 provides the signal for further control, measurement, or communication by the sensor 100.

The magnitude of the electromagnetic signal varies depending on the number of "ballistic photons" which passes through it, indicating thickness and density of the object being sensed. Thus, when an object eclipses the trip region in its entirety, the magnitude of the electromagnetic signal will be lower for a high density object of a particular thickness than for an object with lower density of the same thickness. Based on the electromagnetic signal magnitude for each coordinate position on the object, a characteristic of the object can be determined. For example, the density at each coordinate position on the object can be derived from the electromagnetic signal magnitudes. Sensor output 180 provides the magnitude of the gated electromagnetic signal. For every voltage reading at 180 when the eclipse indicator 130 is active, a measurement of a characteristic, such as density or thickness, of an object can be obtained at each coordinate position on the object. Processor and Storage Unit 181 provides for storage and subsequent signal processing of the electromagnetic signal magnitude, such as for imaging.

When used as an electronic trip wire, the trip region can be used to indicate the presence of an object along any portion of the trip region. When the magnitude of the electromagnetic signal is sufficiently low (below a predetermined threshold), the sensor will provide an eclipse indication. The eclipse indication signal can be used for further processing, control, or communication.

FIG. 3 shows a more detailed block diagram of the sensor 200 in accordance with the present invention. Power is supplied to the sensor 200 via port 203. In this example, a 9 volt source is sufficient. Port 203 is connected to voltage regulator 204 which regulates a substantially constant $V_{DD}$ supply of 5 volts in this example.

A pulse repetition frequency (PRF) generator 214 provides a 2 MHz clock signal, or timing signal, for the sensor 200 in this example. The 2 MHz timing signal is used by both the transmitter 220 and the receiver 210. For the transmitter 220, the 2 MHz timing signal is provided to a line driver 215. A capacitor 216 is connected between the output of the line driver 215 and node 211. An inductor 217 is coupled between the power supply and the cable 212 at node 211 to supply power to the transmitter 220. Both the timing signal and the injected power are superimposed and delivered to transmitter 220 via cable 212.

The transmitter 220 receives the superimposed power and timing signal at port 221. The power take-off circuitry includes an inductor 222 connected between port 221 and node 244. A capacitor 223 is connected between node 244 and ground (GND). The power from this power take-off circuit is delivered to all other components of the transmitter 220. A line receiver 225 receives the timing signal. A capacitor 224 is connected between port 221 and line receiver 225. The output of the line receiver 225 is provided to a transmitter pulse forming network (PFN) 226 that generates a 2 ns pulse to a gated or pulsed 2 GHz transmitter RF oscillator 227, in this example. The gated 2 GHz transmitter RF oscillator is connected to a quarter-wave ($\lambda/4$) wire monopole transmitter antenna 229 via port 228. The transmitter antenna 229 radiates the electromagnetic signal, a 2 ns RF burst, in all directions.

The sensor region 201 is represented as a cylinder and includes a cylindrical trip region 202. The trip region 202 is the direct path of the electromagnetic signal from the transmitter antenna 229 to the receiver antenna 243.

The timing signal at node 247 generated by the PRF generator 214 is also used by the receiver 210. A Divide-by-N frequency divider 217 receives the timing signal and provides a first phase signal at a reduced frequency to represent a phase state of 90 degrees at node 219. The first phase signal at node 219 is also provided to a Divide-by-2 frequency divider 218 which generates a second phase signal at half the frequency of the first phase signal at node 230 to represent a phase state of 180 degrees from the timing signal. A quadrature phase modulator 245 receives the timing signal at node 246, the first phase signal at node 219, and the second phase signal at node 230. The output of the quadrature phase modulator 245 is a phase signal that hops among four phase states of 0 degrees, 90 degrees, 180 degrees, and 270 degrees. The phase signal hops from one phase state to another at a frequency of 500 Hz. In other embodiments, the phase signal hops from one phase state to another at a frequency between 10 Hz and 100 KHz. In essence, the phase signal provides additional time delays (represented by each of the phase states) to a subsequent delay circuit 231.

The phase signal is provided to a delay circuit 231 which is adjusted so that, at any one sampling interval, the receiver 210 gates, or samples, the electromagnetic signal at a phase state from a point near its leading edge. Without the phase signal, the delay circuit 231 controls the time at which the receiver 210 samples the arriving electromagnetic signal from the transmitter 220. Because the distance between the transmitter 220 and the receiver 210 is fixed, the delay can be readily calculated. Theoretically, the receiver 210 should sample the arriving direct RF path electromagnetic signal at its leading edge. However, due to variations in circuit components and other environmental conditions, the receiver 210 cannot always sample exactly at the leading edge. Thus, the delay circuit 231 provides the receiver 210 with a sample point near the leading edge of the arriving electromagnetic signal. With the phase signal, the new sample point is located at a point which is a phase state from the original sample point. Although the overall sampling occurs at the frequency of the PRF generator 214, the phase state changes at a slower rate. Thus, in one example, sampling occurs at 2 MHz but the phase state changes at 500 Hz.

The delayed phase signal is then provided to a receiver pulse forming network (PFN) 232 which provides a 2 ns pulse to a 2 GHz pulsed receiver RF oscillator 233. The output of the pulsed receiver RF oscillator 233 is provided to a sampling circuit 234. In one embodiment, the sampling circuit is a single diode sample-and-hold circuit that acts as a mixer circuit for the RF oscillator and the received electromagnetic signal at pod 242. Adjustments to the delay circuit 231 can be made such that the receiver PFN 232 pulses the pulsed receiver RF oscillator 233 at the time of arrival of the direct path electromagnetic signal at port 242 from the transmitter 220. Such pulsing results in the gating or sample-and-holding by sampling circuit 234 of a portion of the electromagnetic signal located at about the leading edge of the electromagnetic signal corresponding to the direct RF path and at phase states modulated at 500 Hz.

At the output of the sampling circuit 234, a holding capacitor 235 is coupled between node 247 and GND. Because the phase signal at the output of the quadrature-phase modulator 245 hops among the four phase states at a rate of 500 Hz, the detected electromagnetic signal at holding capacitor 235 has spectral components at 500 Hz. The detected electromagnetic signal is amplified by amplifier 236 to produce an amplified electromagnetic signal. Amplifier 236 is bandlimited to provide coherent integration of a large number (e.g., 10–10,000) of received and sampled RF pulses. Peak detector 237 detects the peak of the amplified electromagnetic signal and produces $V_{PD}$ at node 238.

$V_{PD}$ provides one input to comparator 239. The other input, $V_{REF}$, is generated by the common voltage source $V_{DD}$ connected in series to a variable resistor 240. The lead for $V_{REF}$ is connected to the variable resistor 240. The comparator 239 compares $V_{PD}$ to $V_{REF}$. When $V_{PD}$ is less than $V_{REF}$, a logic level signal is provided to eclipse indicator 241 indicating that an eclipse has occurred. As discussed above, an eclipse is an obstruction of the trip region 202 by an object along a direction transverse to the length of the trip region 202. Thus, when an object totally eclipses the direct path between the transmitter antenna 229 and the receiver antenna 243, $V_{PD}$ decreases to a level below $V_{REF}$. Alternatively, a voltage reading from sensor output 250, which corresponds to $V_{PD}$, will indicate a characteristic of the object, and can be stored for subsequent processing. When the entire object is scanned, a plurality of $V_{PD}$ readings for all coordinate positions of the object will provide a measure of density, for example, of various points on the object.

In another embodiment of the present invention, the sensor can be used as an electronic trip wire. As described above, when an object totally eclipses the direct path between the transmitter antenna 229 and the receiver antenna 243, $V_{PD}$ decreases to a level below $V_{REF}$. When $V_{PD}$ is less than $V_{REF}$, a logic level signal is provided to eclipse indicator 241 indicating that an eclipse has occurred. The logic level on eclipse indicator 241 provides an indication of whether an object has totally eclipsed the trip region 202. In other embodiments, a partial eclipse of the trip region 202 will be sufficient to "trip" the sensor. An adjustment of $V_{REF}$ will provide various user-selected trip points.

In another embodiment of the present invention, as shown in FIG. 3, the sensor employs randomly or pseudo-randomly dithered PRF operation. Without noise dithering, the emission spectrum shows spectral lines at harmonics of the pulse repetition frequency. The envelope formed by the spectral lines is identical in shape to the spectrum produced by a single impulse. If either random or code-generated pseudo-random modulation, or dither, is added, the emission spectrum can be spread to resemble the shape of a single impulse. Hence, the peak amplitude is reduced because the energy that was concentrated in individual lines is spread out. Interference to conventional receivers is reduced accordingly, and resembles thermal noise. With noise dithering, multiple and independent sensors 200 may be co-located without interference with a noise generator 213 coupled to the PRF generator 214. The noise generator 213 introduces random variations to the PRF generator 214.

Thus, in FIG. 3, one embodiment of the present invention shows a sensor having a receiver and a transmitter coupled to the receiver via a cable for timing and power signals. The transmitter sends electromagnetic signals via a transmitter antenna and the receiver receives the transmitted electromagnetic signals. A pulse repetition frequency (PRF) generator generates the timing signal that is used by both the receiver and the transmitter. In the transmitter, the timing signal is used by the pulse forming network (PFN) to enable the pulsed transmitter RF oscillator to deliver an electromagnetic signal in the form of a short RF pulse or burst to the transmitter antenna. The electromagnetic signal is radiated and received by the receiver antenna in the form of a direct path electromagnetic signal and a time-delayed indirect path electromagnetic signal.

The receiver gates the direct path electromagnetic signal with a sampling circuit which is activated by a pulsed receiver RF oscillator and a receiver pulse forming network (PFN). A delay circuit adjusts for the distance between the transmitter antenna and the receiver antenna so that the receiver PFN does not activate the pulsed receiver RF oscillator until the PFN is enabled; that is, the receiver gating function coincides with the arrival of the transmitted direct RF path electromagnetic signal. A quadrature-phase modulator provides a phase signal to the delay circuit. The phase signal hops among four phase states (0 degrees, 90 degrees, 180 degrees, and 270 degrees) at a rate of 500 Hz and provides the sampling circuit with sampling points on the electromagnetic signal. The quadrature-phase modulator receives the timing signal from the PRF generator. The detected electromagnetic signal is then amplified, peak detected, and then compared to a voltage reference by a comparator. When an object eclipses the trip region of the sensor, the magnitude of the resulting detected electromagnetic signal is less than that of the voltage reference at the input of the comparator, and the output of the comparator provides this eclipse indication.

In one embodiment, the magnitude of the resulting detected signal varies depending on the number of "ballistic photons" passing through the object, indicating a characteristic of the object, such as thickness or density; thus, lower signal levels indicate higher density of the object and higher signal levels indicate lower density. In another embodiment, the eclipse indicator can be used for electronic trip wire applications. When the resulting detected signal is below the reference voltage, a trip has occurred and indicated at the eclipse indicator. With noise dithered operation, multiple and independent sensors may be co-located without interference.

Figure 4:
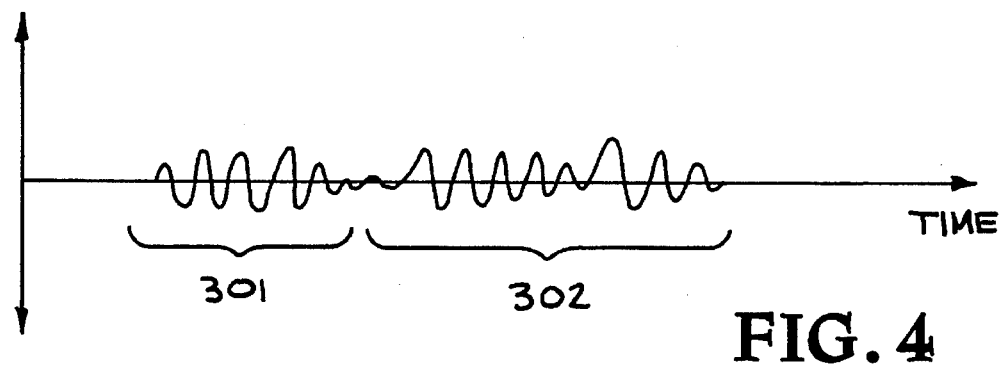
FIG. 4 shows an illustrative plot of the direct path and indirect path RF waveform with respect to time.
Figure 5:
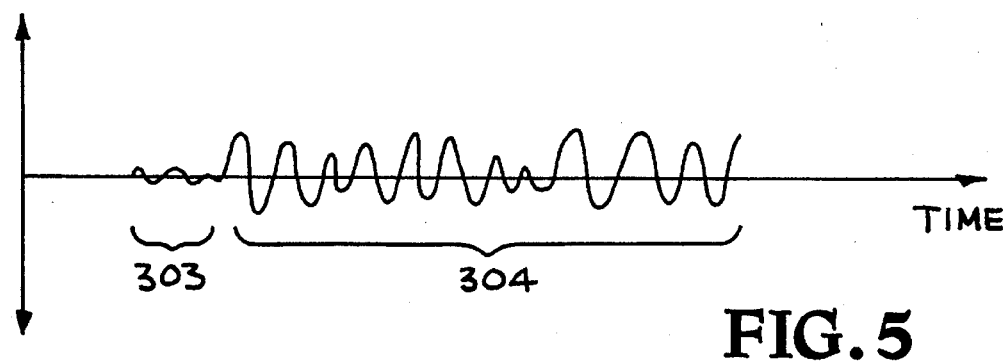
FIG. 5 shows an illustrative plot of the RF waveform with respect to time and the eclipsed signal when an object obstructs the trip region in accordance with the present invention.
Figure 6:
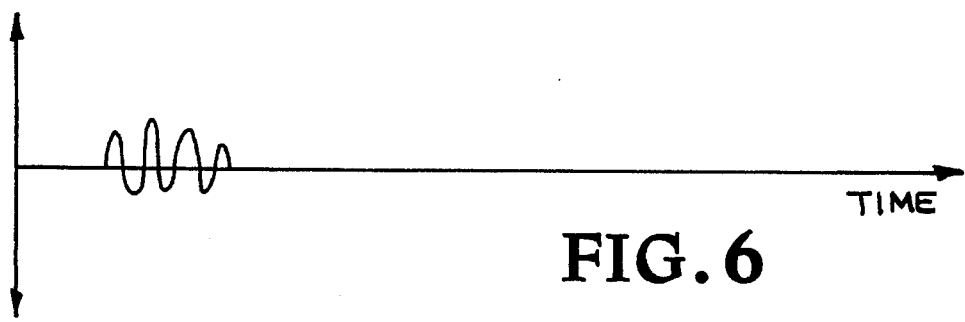
FIG. 6 shows an illustrative plot of the timing of the receiver gating, or sampling, signal which coincides with the eclipsed RF signal in accordance with the present invention.

FIGS. 4, 5, and 6 show illustrative plots of the magnitude of the received electromagnetic signal with respect to time. FIG. 4 shows the electromagnetic signal at the receiver antenna when the sensor region is unobstructed. The initial RF pulse or burst 301 represents the direct path electromagnetic signal. A delayed RF burst 302 represents the indirect path electromagnetic signal. FIG. 5 shows the result of an object eclipsing the trip region of the sensor. The direct path RF burst 303 is substantially reduced in magnitude while the delayed RF bursts 304 from indirect paths are unaffected in magnitude. FIG. 6 shows the timing of the RF pulse from the pulsed receiver RF oscillator which is adjusted during installation to coincide with the arrival of the direct RF path electromagnetic signal. When viewed in conjunction with FIG. 5, FIG. 6 shows the receiver gating, or sampling, signal coinciding in time with the eclipsed RF burst.

Figure 7:
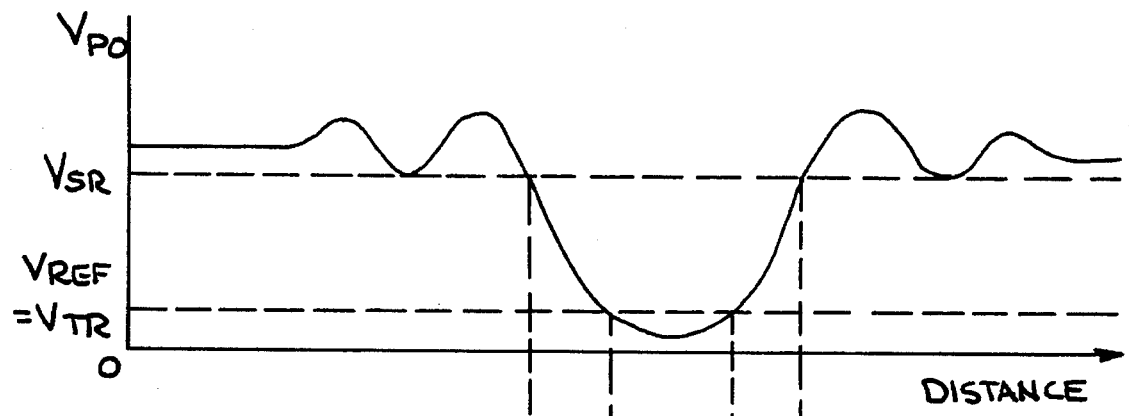
FIG. 7 shows an illustrative plot of the voltage output of the peak detector with respect to distance across the trip region as an object passes across the trip region in accordance with the present invention.

FIG. 7 illustrates the effect of a trip region eclipse on the peak detected voltage $V_{PD}$. The abscissa, or horizontal axis, indicates distance as an object moves in a direction transverse to the length of the cylindrical sensor region 401 from a point outside of the sensor region 401, through the sensor region 401 and the trip region 402, and finally to a point outside of the sensor region 401. The ordinate, or vertical axis, shows the magnitude of the peak detected voltage $V_{PD}$ at the input to the comparator 239 (see FIG. 3).

As FIG. 7 shows, when the object is located outside the sensor region 401, $V_{PD}$ is at a level above a sensor region voltage $V_{SR}$. As the object moves into the sensor region 401, $V_{PD}$ is at a level less than $V_{SR}$ but above the trip region voltage $V_{TR}$ (or the voltage reference $V_{REF}$). In the sensor region, scatter from the obstructing object creates interference and hence decreases $V_{PD}$. When the object moves into the trip region 402, $V_{PD}$ decreases even further but remains at a level above $V_{TR}$ ($V_{REF}$). When the object substantially obstructs the entire direct path of the electromagnetic signal, an eclipse occurs and $V_{PD}$ falls below $V_{REF}$. When such an eclipse occurs, the sensor provides an eclipse indication. In conjunction with the eclipse indication, the magnitude of $V_{PD}$ indicates a characteristic, such as density, thickness, or presence, of the object and can be used in subsequent image processing steps. For electronic trip wire applications, the eclipse indication provides that the sensor has been "tripped," or activated. $V_{REF}$ can be adjusted so that an eclipse indication will be provided as soon as the object moves into the trip region 402. Thus, depending on the user-adjustable value of $V_{REF}$, an eclipse indication can be provided for those situations where the object creates a partial eclipse and for those situations where the object creates a substantially total eclipse of the direct RF path of the electromagnetic signal.

Figure 8:
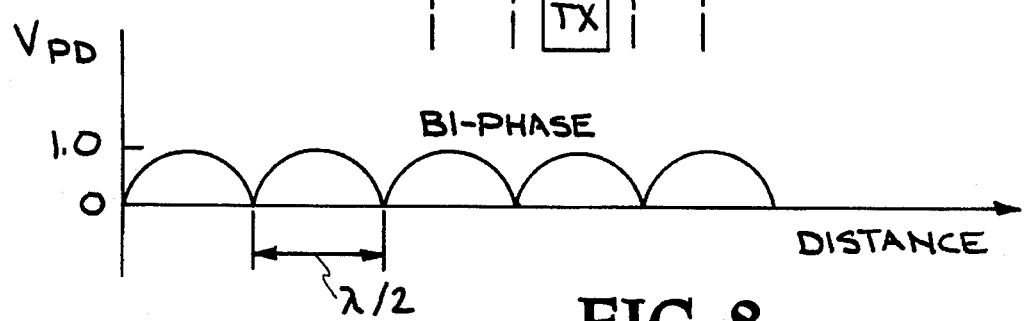
FIG. 8 shows an illustrative plot of the voltage output of the peak detector when Biphase modulation is used.
Figure 9:
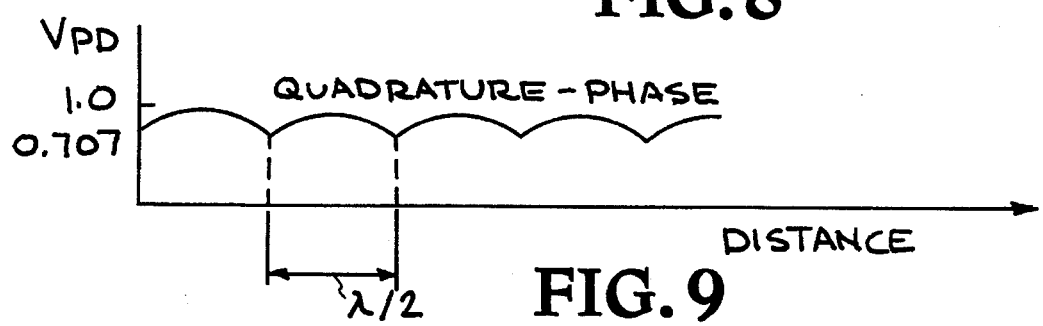
FIG. 9 shows an illustrative plot of the voltage output of the peak detector when Quadrature-phase modulation is used in accordance with the present invention.

FIGS. 8 and 9 illustrate the effects on $V_{PD}$ when different phase modulation schemes are used in the receiver to detect the electromagnetic signal. FIG. 8 shows the $V_{PD}$ sensitivity pattern as the distance between the transmitter antenna and the receiver antenna is varied and binary phase modulation is used. The receiver can alternately sample between 0 degrees and 180 degrees at a rate of 500 Hz. However, as FIG. 8 shows, nulls at a spacing of λ/2 exists. These nulls are caused by the beating of the transmitter RF pulse and the receiver RF gating pulse in the sampling circuit, which functions as a mixer. To eliminate the nulls, quadrature-phase modulation is used where sampling is accomplished at 0 degrees, 90 degrees, 180 degrees, and 270 degrees at a rate of 500 Hz. FIG. 9 shows the resulting $V_{PD}$ sensitivity pattern with the nulls eliminated.

Figure 10:
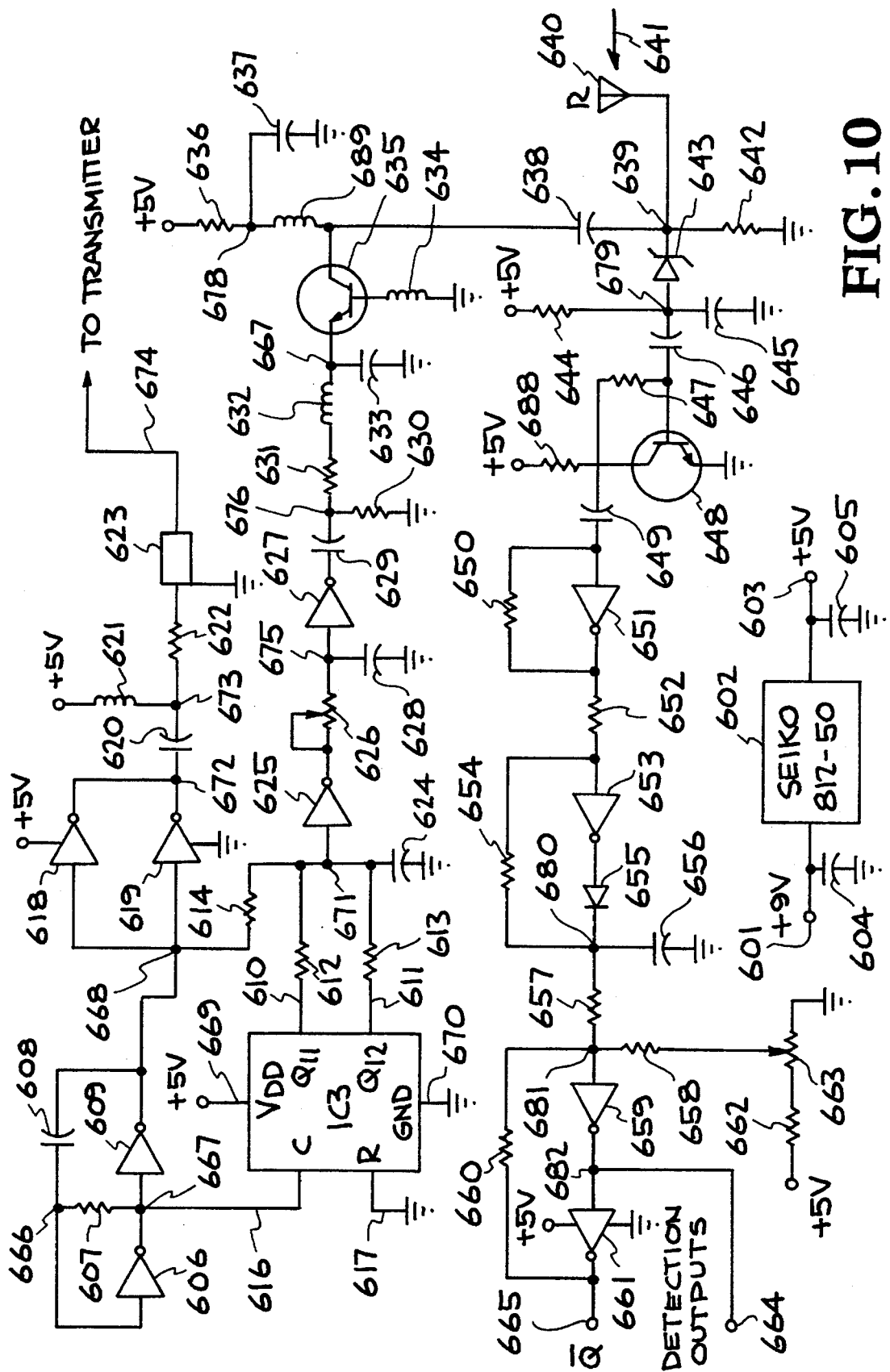
FIG. 10 is a circuit diagram of the receiver of an embodiment of the present invention.
Figure 11:
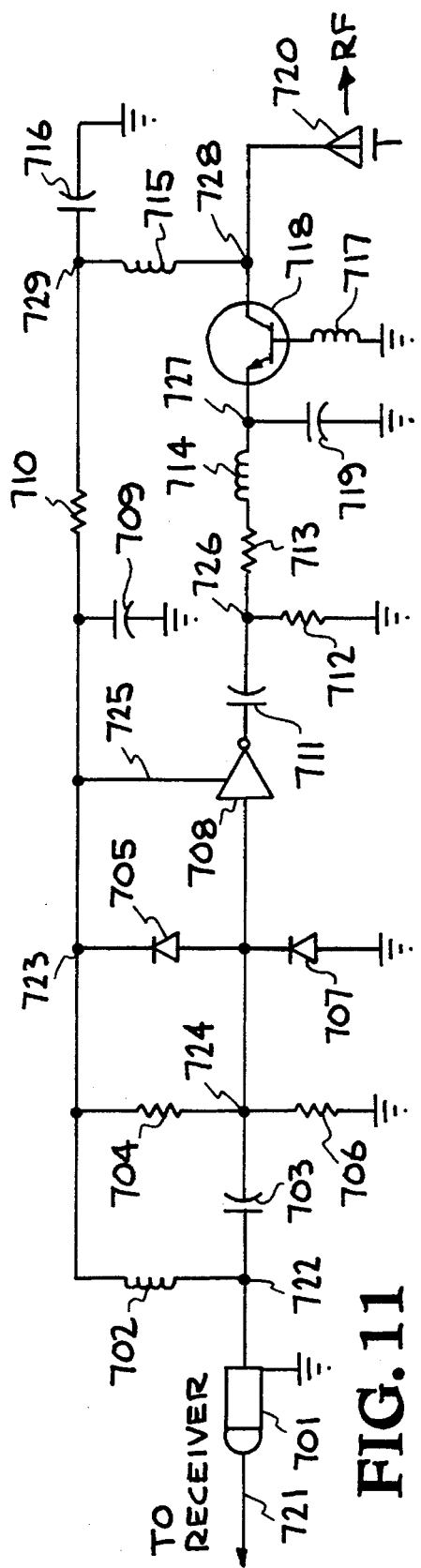
FIG. 11 is a circuit diagram of the transmitter of an embodiment of the present invention.

FIGS. 10 and 11 show representative circuit diagrams of the receiver and transmitter, respectively, of an embodiment of the present invention. Component values and specific manufacturer's IC device part names are exemplary only.

FIG. 10 shows a detailed circuit diagram of the receiver portion of the sensor. In this example, IC1 is a National Semiconductor 74AC04 hex inverter, IC2 is a Motorola MC14069 hex inverter, and IC3 is a Motorola MC14020 binary counter. Inverters 606, 609, 618, 619, 625, and 627 are found in IC1. Inverters 661, 659, 653, and 652 are found in IC2. Binary counter 615 is found in IC3.

Power, in the form of a 9 volt source, is provided to the sensor at pod 601, with a capacitor 604 connected in parallel between port 601 and GND. A Seiko part no. 812-50 voltage regulator 602 is also connected in parallel between pod 601 and port 603. A capacitor 605 is connected between port 603 and GND. At pod 603, a $V_{DD}$ of 5 volts is supplied to the receiver 600 and the transmitter (as shown in FIG. 11).

For the pulse repetition frequency (PRF) generator, the input to the inverter 606 is connected to node 666. The output of inverter 606 is connected to node 667. A resistor 607 is connected between node 666 and node 667. A capacitor 608 is connected between node 666 and node 668 at the output of inverter 609. The input of inverter 609 is connected to node 667. In this example, a 2 MHz timing signal is generated.

The timing signal at node 668 is provided to a line driver comprising two inverters 618, 619 in parallel. The timing signal 668 is provided to the commonly tied input to inverters 618 and 619. The outputs of these inverters 618, 619 are also commonly tied at node 672. Coupling capacitor 620 is connected between node 672 and node 673. Additional power from $V_{DD}$ is supplied to the line at node 673. Inductor 621 is connected between the power source and node 673. Resistor 622 is connected between node 673 and port 623, where the superimposed power and timing signals are delivered to the transmitter via a cable 674.

The timing signal at node 667 is provided to the clock input 616 of binary counter 615. The binary counter 615 also receives its $V_{DD}$ input at port 669, its GND at port 670, and a constantly grounded reset signal at port 617. The grounded reset signal allows the counter 615 to count continuously in response to the negative-going edge of the timing signal. The outputs of the binary counter 615 are at port 610 for Q11 and pod 611 for Q12. Resistor 612 is connected between Q11 output port 610 and node 671. Resistor 613 is connected between Q12 output port 611 and node 671. Resistor 614 is connected between node 668 and node 671. A capacitor is connected between node 671 and GND. These outputs of the binary counter 615 provide additional time delays to control the timing of the sampling function of the receiver.

A delay circuit is provided to compensate for variations in the distance between the transmitter antenna and the receiver antenna. The input to the inverter 625 is connected to node 671. The output of inverter 625 is connected to variable resistor 626, which is used to adjust delay times for enabling the pulse forming network (PFN). A capacitor 628 is connected between node 675 and GND. The input to inverter 627 is connected to node 675. The output of inverter 627 is connected to a pulse forming network (PFN), which activates the pulsed RF oscillator.

The input to the pulse forming network (PFN) relies on the delay circuit. Capacitor 629 is connected between the output of inverter 627 and node 676. A resistor 630 is connected between the node 676 and GND. Resistor 631 and inductor 632 are connected in series between node 676 and node 677. Capacitor 633 is connected between node 677 and GND. In this example, the resulting pulse has a duration of 2 ns. The resulting pulse is then applied to a pulsed RF oscillator.

In this example, the npn bipolar junction transistor 635 is a commercially available part no. NE856. The emitter of transistor 635 is connected to node 677. The base of transistor 635 is connected to inductor 634, which is connected to GND. The collector of transistor 635 is connected to inductor 679, which is connected at the other end to node 678. A capacitor 637 is connected between node 678 and GND. A resistor 636 is connected between node 678 and the $V_{DD}$ supply. The collector of transistor 635 is also connected to capacitor 638. The opposite plate of capacitor 638 is connected to node 639. Node 639 provides a junction for the pulsed RF burst for the receiver gate and the electromagnetic signal from the transmitter. In this example, the frequency of the pulsed RF oscillator is 2 GHz. Receiver antenna 640 is connected to node 639.

Electromagnetic signal 641 arrives at the receiver antenna 640 from all directions. The RF burst corresponding to the direct path arrives first. However, the delay circuit controls the timing of the RF pulse generation in the RF oscillator so that the RF pulse for gating the electromagnetic signal coincides with the direct path electromagnetic signal.

For the sampling circuit, this example uses a diode 643 which is a commercially available part no. HSMS2810. The receive antenna 640 is typically formed of a wire 1.5 inches in length. The cathode of diode 643 is connected to node 639 and the anode of diode 643 is connected to node 679. Resistor 644 is connected between the $V_{DD}$ supply and node 679. Resistor 642 is connected between GND and node 639. Holding capacitor 645, which holds the sampled electromagnetic signals, is connected between node 679 and GND.

For the amplifier circuit located between the peak detector and the sampling circuit, this example uses, as one of its components, a npn bipolar junction transistor 648 which is a commercially available part no. 2N3904. The amplifier is bandlimited to provide coherent integration of a large number (e.g., 10–10,000) of received and sampled RF pulses. Coupling capacitor 646 is connected between node 679 and the base of transistor 648. Resistor 647 is connected between the base of transistor 648 and the collector of transistor 648. A resistor is also connected between the collector of transistor 648 and $V_{DD}$ supply. The emitter of transistor 648 is connected to GND. Coupling capacitor 649 is connected between the collector of transistor 648 and the input to inverter 651. Resistor 650 is connected between the input to inverter 651 and the output of inverter 651.

For the peak detector, resistor 652 is connected between the output of inverter 651 and the input to inverter 653. Resistor 654 is connected between the input to inverter 653 and node 680. Capacitor 656 is connected between node 680 and GND. The output of inverter 653 is connected to the anode of diode 655. The cathode of diode 655 is connected to node 680. $V_{PD}$ appears at node 680. Thus, for image processing applications, the magnitude of $V_{PD}$ at node 680 indicates the density or thickness of the object in the trip region. In the preferred embodiment, a total eclipse of the trip region is required before the corresponding $V_{PD}$ magnitude is stored and further processed for imaging. In this example, diode 655 is a commercially available part no. IN4148.

For the comparator, resistor 657 is connected between node 680 and node 681. For the adjustable reference voltage $V_{REF}$, $V_{DD}$ supply is provided to resistor 662 and variable resistor 663. The other end of variable resistor 663 is connected to GND. Resistor 658 is connected between node 681 and a tap on variable resistor 663. By adjusting variable resistor 663, different "trip" points, or $V_{REF}$, are available. Thus, in electronic trip wire applications, a total eclipse of the trip region is not necessary to "trip" or activate the sensor. However, in other embodiments of the electronic trip wire, a substantially total eclipse is necessary to activate the sensor.

Inverter 659 is connected between node 681 and node 682. A high logic level at node 682 appears at eclipse indicator 664 when the trip region is eclipsed by an object. Node 682 is also connected to the input of inverter 661. The output at node 665 of inverter 661 is the complementary output of the logic level at eclipse indicator 664 and node 682. A resistor 660 is connected between node 681 and node 65.

FIG. 11 shows a detailed circuit diagram of the transmitter portion of an embodiment of the present invention. The transmitter includes a power takeoff circuit, a line receiver, a pulse forming network, and a pulsed RF oscillator. In this example, IC4 (inverter 708) is a National Semiconductor 74AC04 hex inverter.

The superimposed power and timing signals from the receiver portion of the sensor are delivered to port 701 of the transmitter via cable 721. The power component of the superimposed signal is delivered to the power take-off circuit in which the inductor 702 is connected between node 722 and node 723. The clock component of the superimposed signal is delivered to a line receiver in which the coupling capacitor is connected between node 722 and node 724. Resistor 706 is connected between node 724 and GND. Resistor 704 is connected between node 724 and node 723. For diode 705, which is a commercially available part no. IN4148, the cathode is coupled to node 723 and the anode to node 724. For diode 707, which is also a commercially available part no. IN4148, the cathode is coupled to node 724 and the anode to GND. The input to inverter 708 is tied to node 724. Power from the power take-off circuit is provided to inverter 708 at port 725. A capacitor 709 is also placed between node 723 and GND. A resistor 710 is placed between node 723 and node 729. In addition, capacitor 716 is placed between node 729 and GND.

For the pulse forming network (PFN), a capacitor 711 is placed between the output of inverter 708 and node 726. A resistor 712 is connected between node 726 and GND. Resistor 713 and inductor 714 are placed in series between node 726 and node 727. A capacitor is placed between node 727 and GND. In this example, a 2 ns pulse is provided to the 2 GHz pulsed RF oscillator.

In response to the 2 ns pulse, the 2 GHz pulsed RF oscillator provides a 2 ns RF burst. A commercially available npn bipolar junction transistor 718 used in this example is part no. NE856. For the transistor 718, the emitter is coupled to node 727, the collector is coupled to node 728, and the base is coupled to inductor 717 which is connected to GND. Additional power from the power take-off circuit is provided by inductor 715, which is placed between node 729 and node 728. The electromagnetic signal, in the form of a 2 ns RF burst, is then delivered to transmitter antenna 720 comprised of a 1.5 inch wire.

Although the preferred mode utilizes a receiver which provides an eclipse indication when a total eclipse occurs in the trip region, other embodiments incorporate partial eclipses of the trip region by adjusting the level of the reference voltage $V_{REF}$ at the comparator stage of the receiver. Thus, the particular application of the present invention dictates the "trip" point of the sensor.

Figure 12:
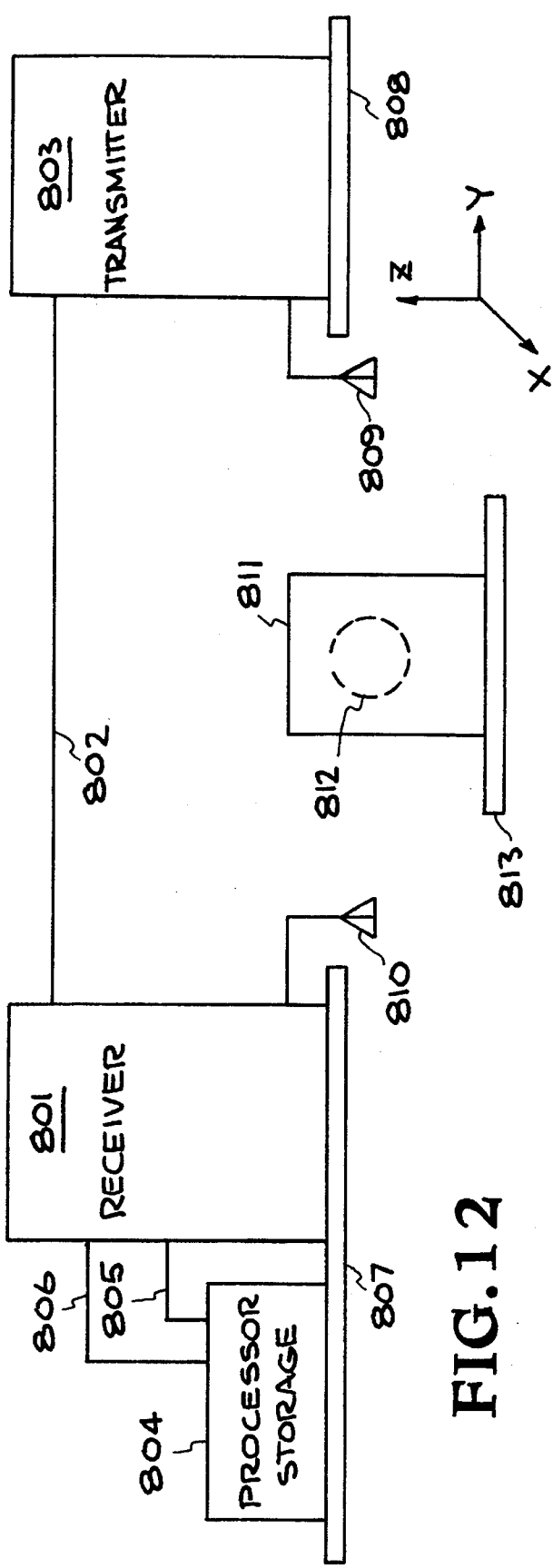
FIG. 12 is a block diagram of another embodiment of the present invention, where computer-aided scanning techniques are used to obtain a three-dimensional characteristic of the object.

In another embodiment of the present invention, as shown in FIG. 12, scanning an object can be accomplished. The sensor includes a receiver 801, cable 802, transmitter 803, signal processor and storage 804, receiver antenna 810, and transmitter antenna 809. The sensor can be placed on a translation stage 807, 808 in a manner like those used in computer-aided translation, or computer-aided tomography, (CAT) scanning. Although FIG. 12 shows the translation stages 807, 808 as being two separate units, they can actually be represented by a single stage. The key is for the transmitter and the receiver to move in unison on the translation stages. Eclipse indicator 805 and detected sample signal 806 are provided to the signal processor and storage unit 804.

An object 812 in a medium 811 is placed on a platform 813. To obtain a characteristic of an object 812, the translation stages 807, 808 are moved along the xz plane. This provides density information of every desired x, z coordinate position through the y-axis; that is, for any given coordinate position x, y, z, the density of the object at that coordinate position as seen along the y-axis can be determined.

The sensor region formed as the direct RF path between the transmitter antenna 809 and the receiver antenna 810 is placed at an initial coordinate position. The translation stages 807, 808 are moved in a desired step incrementally along one axis (either x or z). The magnitude of the detected sample signal and the coordinate position are processed and stored in the processor and storage unit 804. The translation stage is then moved to the next coordinate position, where the processing and storage steps are accomplished again for the new coordinate position. The entire process of moving the translation stage, processing the magnitude of the detected sample signal, and storing the coordinate position and magnitude of the detected sample signal is executed until data for every desired coordinate position is recorded. For a three-dimensional representation of the object 812, the above steps for each plane are executed for every incremental angle θ about the z-axis until data is recorded for all coordinate positions x, y, z for all planes spanning from θ=0 degrees to θ=180 degrees.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A narrow field electromagnetic sensor, comprising:
   a transmitter which transmits a sequence of electromagnetic signals in response to a transmit timing signal;
   a receiver which samples the sequence of electromagnetic signals in response to a receive timing signal, and generates a sampled signal;
   a timing circuit which supplies the transmit timing signal to the transmitter and the receive timing signal to the receiver, the receive timing signal gating the receiver to sample a portion of each electromagnetic signal that travels along a direct electromagnetic signal propagation path between the transmitter and the receiver; and
   a signal processor coupled to the output of the receiver and responsive to the sampled signal to provide an indication of a characteristic of an object in the direct path between the transmitter and the receiver.

2. A narrow field electromagnetic sensor of claim 1, wherein the characteristic is density.

3. A narrow field electromagnetic sensor of claim 1, wherein the characteristic is thickness.

4. A narrow field electromagnetic sensor of claim 1, wherein the characteristic is presence of the object in the direct path of the electromagnetic signal.

5. A narrow field electromagnetic sensor of claim 1, further comprising:
   a phase modulator for modulating the receive timing signal into a plurality of phase states for sampling the sequence of electromagnetic signals.

6. A narrow field electromagnetic sensor of claim 5, wherein the phase modulator comprises a quadrature-phase modulator providing four phase states of about 0 degrees, about 90 degrees, about 180 degrees, and about 270 degrees.

7. A narrow field electromagnetic sensor of claim 5, wherein the receiver samples the electromagnetic signal at each of the phase states sequentially, the phase states changing at a frequency of about 500 Hz.

8. A narrow field electromagnetic sensor of claim 1, wherein the electromagnetic signal is an RF burst.

9. A narrow field electromagnetic sensor of claim 8, wherein the transmitter further comprises:
   a line receiver for amplifying the transmit timing signal;
   a transmitter pulse forming network coupled to the output of the line receiver and responsive to the amplified transmit timing signal to generate a transmitter pulse; and
   a pulsed transmitter RF oscillator coupled to the output of the transmitter pulse forming network and responsive to the transmitter pulse for forming an electromagnetic signal.

10. A narrow field electromagnetic sensor of claim 9, wherein the receiver further comprises:
    a receiver pulse forming network coupled to the output of the timing circuit and responsive to the receive timing signal for forming a receiver pulse;
    a pulsed receiver RF oscillator coupled to the output of the receiver pulse forming network and responsive to the receiver pulse for forming a receiver gating signal; and
    a sampling circuit coupled to the output of the pulsed receiver RF oscillator and responsive to the receive gating signal and the electromagnetic signal for forming a sampled signal.

11. A narrow field electromagnetic sensor of claim 10, wherein the signal processor comprises:
    an amplifier coupled to the output of the sampling circuit and responsive to the sampled signal for generating an amplified sampled signal;
    a peak detector coupled to the output of the amplifier and responsive to the amplified sampled signal for generating a peak detected signal which is an indication of a characteristic of the object; and
    a comparator coupled to the output of the peak detector and responsive to the peak detected signal and a predetermined reference signal, the comparator generating an eclipse indication when the peak detected signal is less than the reference signal.

12. A narrow field electromagnetic sensor of claim 1, further comprising a noise generator coupled to the input of the timing circuit for providing random variations to the timing circuit and reducing interference with other co-located sensors.

13. A narrow field electromagnetic sensor of claim 1, further comprising:
    a translation stage for mounting the transmitter and the receiver and moving the transmitter and the receiver with respect to the object; and
    a processor and storage unit coupled to the signal processor and responsive to the sampled signal for storing a coordinate position on the object and the magnitude of the sampled signal at each coordinate position.

14. An electronic trip wire, comprising:
    a transmitter responsive to a transmit timing signal for generating a sequence of RF bursts;
    a receiver responsive to a receive timing signal for sampling a portion of each RF burst, and for generating a sampled receive signal;
    a timing circuit for providing the transmit timing signal to the transmitter and the receive timing signal to the receiver so that the receiver samples a portion of each RF burst that corresponds to a direct RF path of the RF burst between the transmitter and the receiver; and
    an eclipse indicating circuit coupled to the output of the receiver and responsive to the sampled receive signal for providing an eclipse indication when an object obstructs the path of the RF burst along the direct RF path.

15. An electronic trip wire of claim 14, further comprising a pulse repetition frequency generator coupled to the input of the timing circuit for providing a clock signal of a predetermined nominal frequency.

16. An electronic trip wire of claim 15, wherein the timing circuit comprises:

a phase modulator coupled to the output of the pulse repetition frequency generator and responsive to the clock signal for generating a receive timing signal that sequentially moves among a plurality of phase states which the receiver uses to sample the RF burst traveling along the direct RF path, each phase state measured from a leading edge of the RF burst.

17. An electronic trip wire of claim 15, wherein the timing circuit comprises a delay circuit which compensates for the direct RF path time-of-flight distance between the transmitter and the receiver so that the receiver samples a portion of the RF burst travelling along the direct RF path.

18. An electronic trip wire of claim 15, wherein the transmitter further comprises:

a transmitter pulse generator responsive to the transmit timing signal for providing a transmitter pulse of a predetermined duration; and a transmitter RF oscillator coupled to the output of the transmitter pulse generator and responsive to the transmitter pulse for providing a RF burst.

19. An electronic trip wire of claim 15, wherein the receiver further comprises:

a receiver pulse generator responsive to the receive timing signal for providing a receiver pulse;

a receiver RF oscillator coupled to the output of the receiver pulse generator and responsive to the receiver pulse for providing a receiver gate signal; and a sampling circuit coupled to the output of the receiver RF oscillator and responsive to the receiver gate signal and the RF burst, wherein the receiver gate signal coincides in time with the RF burst to provide a sampled receive signal.

20. An electronic trip wire of claim 15, wherein the eclipse indicating circuit comprises:

a peak detector responsive to the sampled receive signal for providing a peak detected signal; and a comparator coupled to the output of the peak detector and responsive to the peak detected signal and an adjustable reference signal for providing an eclipse indication when the peak detected signal is less than the reference signal.

21. A method of sensing a characteristic of an object, comprising:

providing a common clock signal at a nominal frequency;

deriving a transmit timing signal and a receive timing signal from the common clock signal;

transmitting a sequence of electromagnetic signals from a transmitter in response to the transmit timing signal;

receiving each electromagnetic signal at a receiver in response to the receive timing signal to provide a sampled signal, the receive timing signal being delayed relative to the transmit timing signal to gate the receiver so that sampling of the electromagnetic signal coincides with arrival of the electromagnetic signal along a direct electromagnetic signal propagation path between the transmitter and the receiver; and providing an indication of a characteristic of the object from the magnitude of the sampled signal.

22. A method of sensing a characteristic of an object of claim 21, further comprising:

comparing the magnitude of the sampled signal with the magnitude of an adjustable reference signal; and providing a trip indication when the magnitude of the sampled signal is less than the magnitude of the adjustable reference signal.

23. A method of sensing a characteristic of an object of claim 21, further comprising:

noise dithering the common clock signal to reduce interference among co-located sensors.

24. A method of sensing a characteristic of an object of claim 21, further comprising:

phase modulating the clock signal to provide a receive timing signal so that sampling the electromagnetic signal occurs at one of a plurality of phase states.

25. A method of sensing a characteristic of an object of claim 23, wherein the step of transmitting a sequence of electromagnetic signals further comprises:

forming a transmit pulse in response to the transmit timing signal; and forming an electromagnetic signal in response to the transmit pulse.

26. A method of sensing a characteristic of an object of claim 25, wherein the step of receiving the electromagnetic signal further comprises:

forming a receiver pulse in response to the receive timing signal;

forming a receive gating signal in response to the receiver pulse that samples the direct path portion of the electromagnetic signal; and forming a sampled signal in response to the receive gating signal and the electromagnetic signal.

* * * * *